United States Patent
Jackson (10) Patent No.: US 9,800,595 B2
(45) Date of Patent: *Oct. 24, 2017

(54) METHODS, SYSTEMS, AND COMPUTER READABLE MEDIA FOR DETECTING PHYSICAL LINK INTRUSIONS

(71) Applicant: Ixia, Calabasas, CA (US)

(72) Inventor: Stephen Samuel Jackson, Chapel Hill, NC (US)

(73) Assignee: Ixia, Calabasas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/860,630

(22) Filed: Sep. 21, 2015

(65) Prior Publication Data

US 2017/0085581 A1    Mar. 23, 2017

(51) Int. Cl.
*H04L 29/06* (2006.01)
*H04L 12/26* (2006.01)

(52) U.S. Cl.
CPC ...... *H04L 63/1416* (2013.01); *H04L 43/0858* (2013.01); *H04L 43/106* (2013.01); *H04L 43/16* (2013.01)

(58) Field of Classification Search
CPC . H04L 63/1416; H04L 43/16; H04L 43/0858; H04L 43/106; H04L 63/0861; H04L 63/083; H04L 63/0853; H04L 43/12; H04L 63/1408; H04L 63/1425; H04L 63/1441; H04L 63/306; H04L 12/2697; H04W 12/06; H04W 12/08; G06F 21/55
See application file for complete search history.

(56) References Cited

U.S. PATENT DOCUMENTS

| | | | |
|---|---|---|---|
| 6,868,069 B2 | 3/2005 | Knobbe et al. | |
| 7,092,586 B2 | 8/2006 | Vokey et al. | |
| 7,881,209 B2 | 2/2011 | Beliles, Jr. et al. | |
| 8,718,482 B1 | 5/2014 | Roberts | |

(Continued)

FOREIGN PATENT DOCUMENTS

| | | |
|---|---|---|
| WO | WO 2011/144263 A1 | 11/2011 |
| WO | WO 2016/168063 A1 | 10/2016 |
| WO | WO 2016/168064 A1 | 10/2016 |

OTHER PUBLICATIONS

Commonly-assigned, co-pending U.S. Appl. No. 14/385,552 for "Methods Systems and Computer Readable Media for One-Way Link Delay Measurement," (Unpublished, filed Apr. 13, 2015).

(Continued)

*Primary Examiner* — Catherine Thiaw
(74) *Attorney, Agent, or Firm* — Jenkins, Wilson, Taylor & Hunt, P.A.

(57) ABSTRACT

The subject matter described herein relates to method, systems, and computer readable media for detecting physical link intrusions. A method for detecting physical link intrusions includes monitoring a link delay signature associated with a physical link based on one-way link delay measurements obtained using at least one network tap. The method also includes determining whether a change in the link delay signature has met or exceeded a threshold value. The method further includes in response to determining that the change in the link delay signature has met or exceeded the threshold value, determining that a physical link intrusion has occurred.

17 Claims, 4 Drawing Sheets

(56) References Cited

U.S. PATENT DOCUMENTS

| | | | |
|---|---|---|---|
| 9,380,070 B1* | 6/2016 | Cain | H04L 63/1416 |
| 2003/0105976 A1* | 6/2003 | Copeland, III | G06F 21/552 |
| | | | 726/4 |
| 2004/0190547 A1* | 9/2004 | Gordy | H04L 63/02 |
| | | | 370/463 |
| 2007/0268938 A1 | 11/2007 | Dowd | |
| 2009/0231191 A1 | 9/2009 | Wu et al. | |
| 2011/0170534 A1 | 7/2011 | York | |
| 2011/0199133 A1 | 8/2011 | Yamada | |
| 2011/0211473 A1 | 9/2011 | Matityahu et al. | |
| 2011/0268097 A1 | 11/2011 | Agrawala et al. | |
| 2012/0166327 A1 | 6/2012 | Amicangioli | |
| 2012/0275317 A1 | 11/2012 | Geva | |
| 2013/0080817 A1 | 3/2013 | Mihelic | |
| 2013/0094515 A1 | 4/2013 | Gura et al. | |
| 2013/0173778 A1* | 7/2013 | Hsy | H04L 43/14 |
| | | | 709/224 |
| 2013/0212439 A1* | 8/2013 | Stevens | H04L 43/12 |
| | | | 714/39 |
| 2013/0259049 A1* | 10/2013 | Mizrahi | H04J 3/0602 |
| | | | 370/392 |
| 2013/0265886 A1 | 10/2013 | Leong | |
| 2013/0278312 A1 | 10/2013 | Getzin et al. | |
| 2013/0329595 A1 | 12/2013 | Scholz | |
| 2013/0343207 A1* | 12/2013 | Cook | H04L 43/0852 |
| | | | 370/252 |
| 2013/0347103 A1 | 12/2013 | Veteikis et al. | |
| 2014/0006610 A1 | 1/2014 | Formby et al. | |
| 2016/0301599 A1* | 10/2016 | Porfiri | H04L 47/115 |
| 2017/0041126 A1 | 2/2017 | Bergeron | |

OTHER PUBLICATIONS

"High Density Modular Fiber Tap," Ixia, http://www.ixiacom.com/products/net-optics-flex-tap, pp. 1-4 (Jul. 2014).

"Ixia Anue 3500—Mobile Backhaul Testing Solution," Ixia Data Sheet, pp. 1-5 (Dec. 2013).

Non-Final Office Action for U.S. Appl. No. 14/819,337 (Mar. 2, 2017).

Notice of Allowance and Fee(s) Due for U.S. Appl. No. 14/685,552 (Mar. 1, 2017).

Notice of Allowance and Fee(s) Due for U.S. Appl. No. 13/933,661 (Feb. 17, 2017).

Notice of Allowance and Fee(s) Due for U.S. Appl. No. 14/688,630 (Apr. 12, 2017).

Commonly-assigned, co-pending U.S. Appl. No. 15/482,672 for "Methods, Systems, and Computer Readable Media for Monitoring, Adjusting, and Utilizing Latency Associated With Accessing Distributed Computing Resources," (Unpublished, filed Apr. 7, 2017).

"External Bypass Switches," Ixia, White Paper, 915-6688-01 Rev. B, pp. 1-5 (Dec. 2015).

Non-Final Office Action for U.S. Appl. No. 14/685,552 (Oct. 20, 2016).

Non-Final Office Action for U.S. Appl. No. 14/688,630 (Oct. 17, 2016).

Non-Final Office Action for U.S. Appl. No. 13/933,661 (Sep. 27, 2016).

Notification of Transmittal of the International Search Report and the Written Opinion of the International Searching Authority, or the Declaration for International Application No. PCT/US2016/040532 (Sep. 12, 2016).

Notification of Transmittal of the International Search Report and the Written Opinion of the International Searching Authority, or the Declaration for International Application No. PCT/US2016/026534 (Jul. 8, 2016).

Notification of Transmittal of the International Searh report and the Written Opinion of the International Searching Authority, or the Declaration for International Application No. PCT/US2016/026533 (Jul. 8, 2016).

Final Office Action for U.S. Appl. No. 13/933,661 (Apr. 12, 2016).

Non-Final Office Action for U.S. Appl. No. 13/933,661 (Dec. 14, 2015).

Commonly-assigned, co-pending U.S. Appl. No. 14/819,337 for "Modeling a Clock," (Unpublished, filed Aug. 5, 2015).

"Network Time Protocol," Wikipedia, https://en.wikipedia.org/wiki/Network_Time_ Protocol, pp. 1-7 (Jul. 3, 2015).

Arnold, "What Are All of These IEEE 1588 Clock Types," http://blog.meinbergglobal.com/2013/10/21/ieee1588clocktypes/, News and Tutorials from Meinberg, pp. 1-6 (Oct. 21, 2013)

"An-1838 IEEE 1588 Boundary Clock and Transparent Clock Implementation Using the DP83640," Application Report, Texas Instruments, pp. 1-9 (Apr. 2013).

Spirent, "Precision Time Protocol (PTP) IEEE 1588," YouTube "alantalkstech", https://www.youtube.com/watch?v=yw-gd01aOYg, pp. 1-11 (Dec. 7, 2011).

Eidson, "IEEE-1588 Standard for a Precision Clock Synchronization Protocol for Networked Measurement and Control Systems—A Tutorial," Agilent Technologies, pp. 1-94 (Oct. 2005).

* cited by examiner

METHODS, SYSTEMS, AND COMPUTER READABLE MEDIA FOR DETECTING PHYSICAL LINK INTRUSIONS

TECHNICAL FIELD

The subject matter described herein relates to computer network security. More particularly, the subject matter described herein relates to detecting physical link intrusions.

BACKGROUND

In computer networks, it is often desirable to detect intrusion or unauthorized access to a physical layer (e.g., a physical link, cable, or medium). For example, in an optical network, an optical cable between two network nodes may be vulnerable to unauthorized taps or other devices that can intercept, copy, or redirect packets. Existing techniques for detecting physical link intrusions are generally expensive and/or cumbersome. For example, one technique involves placing a physical link (e.g., a fiber or electrical cable) in a pressurized tube, placing pressure sensors along the pressurized tube, and detecting whether the pressurized tube changes pressure. In this example, it is assumed that an intruder trying to access the physical link will puncture the pressurized tube thereby altering the pressure in the pressurized tube. However, the technique is quite costly, and the nature of the pressurization loss is binary in that it merely shows a breach is occurring. There is no gradient. Another technique involves using a time domain reflectometer on the physical link, but this technique is also costly and cumbersome, and can show false positives, making monitoring challenging.

Accordingly, there exists a need for improved methods, systems, and computer readable media for detecting physical link intrusions.

SUMMARY

The subject matter described herein relates to method, systems, and computer readable media for detecting physical link intrusions. A method for detecting physical link intrusions includes monitoring a link delay signature associated with a physical link based on one-way link delay measurements obtained using at least one network tap. The method also includes determining whether a change in the link delay signature has met or exceeded a threshold value. The method further includes in response to determining that the change in the link delay signature has met or exceeded a threshold value, determining that a physical link intrusion has occurred.

The subject matter described herein may be implemented in hardware, software, firmware, or any combination thereof. As such, the terms "function", "node", or "module" as used herein refer to hardware, which may also include software and/or firmware components, for implementing the feature being described. In some exemplary implementations, the subject matter described herein may be implemented using a computer readable medium having stored thereon computer executable instructions that when executed by the processor of a computer cause the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for detecting physical link intrusions. In the pursuit of greater network and/or communications security, sophisticated network users may deploy or seek out "clear layer 2 (L2)" communication pathways over which their data can be sent and received. Clear L2 communication pathways typically include those pathways or links that are optical, as opposed to those that include any type of optical-electrical interfaces interposed along the pathway. In practice, a clear L2 pathway may present fewer opportunities for an eavesdropper to intercept packets that are sent along the link. However, a clear L2 pathway is not invulnerable in theory to eavesdropping attacks.

The subject matter described herein can be useful in detecting physical link intrusions in various networks and/or with various physical links. Further, intrusion detection techniques, methods, systems, or mechanisms described herein can be used to detect physical link intrusion in any network, including synchronous networks, wired electrical networks, or any other type of network where the link delay is symmetric or asymmetric. For example, an intrusion detection module in accordance with some aspects of the subject matter described herein may monitor a physical link and may determine whether a change in a bi-directional link delay signature (e.g., packet transit time) meets or exceeds a threshold value (e.g., one standard deviation from an average bi-directional link delay signature or a baseline bi-directional link delay signature). If so, in this example, the intrusion detection module may determine that an intrusion has occurred and may notify an operator, a network node, or another entity.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
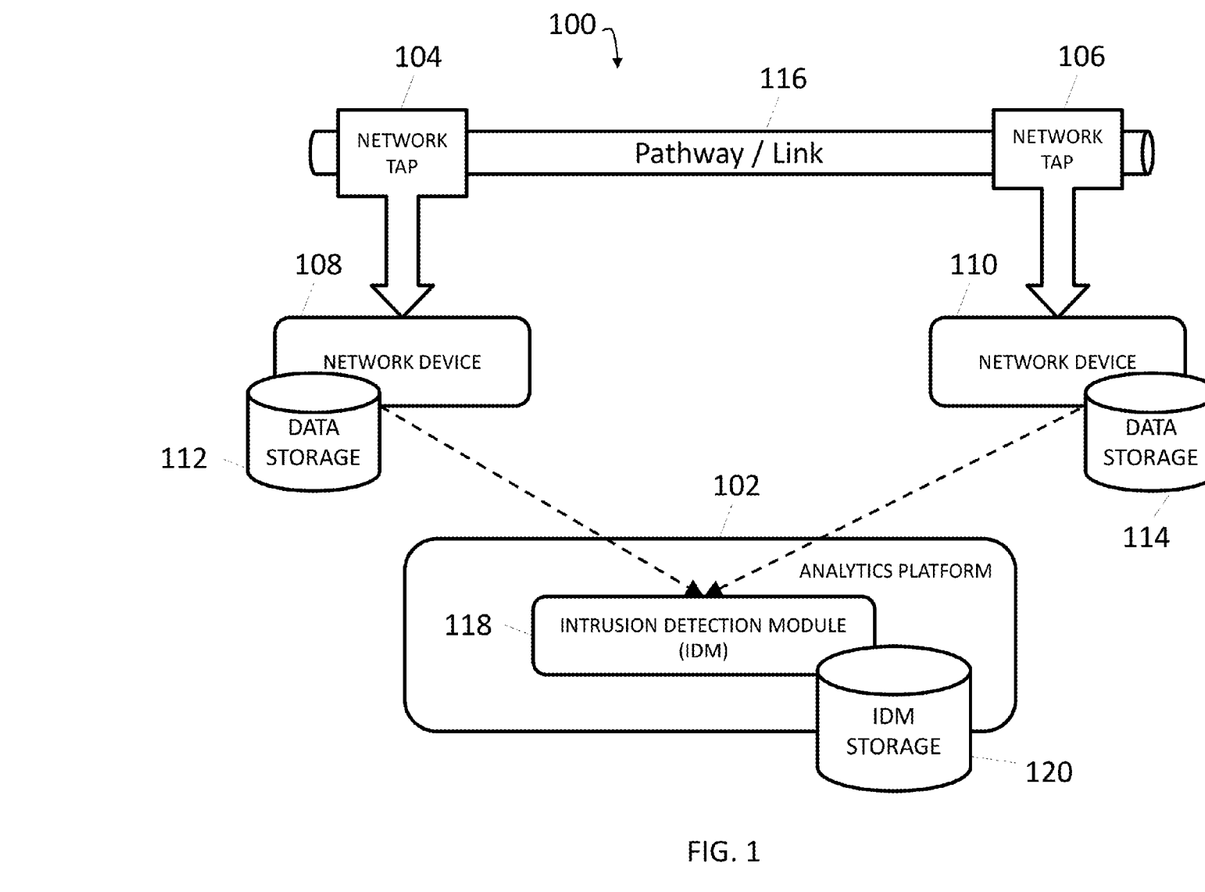
FIG. 1 is a block diagram illustrating a system for detecting physical link intrusions according to an embodiment of the subject matter described herein.

FIG. 1 is a block diagram illustrating a system 100 for detecting physical link intrusions according to an embodiment of the subject matter described herein. Referring to FIG. 1, system 100 may include an analytics platform 102. Analytics platform 102 may represent any suitable entity for performing one or more aspects of the subject matter described herein. For example, analytics platform 102 may be a computing platform, a network equipment test platform, or a test device usable to monitor a link or link related characteristics (e.g., an average link delay) and/or to detect physical link intrusion. An example of an analytics platform suitable for use with embodiments of the subject matter described herein is the Ixia 3500 or another test platform available from Ixia.

In some embodiments, analytics platform 102 may include an intrusion detection module (IDM) 118 and an IDM storage 120. IDM 118 may represent any suitable entity (e.g., a computing platform, software executing on a processor, a logic device, a module, a complex programmable logic device (CPLD), a field-programmable gate array (FPGA), and/or an application specific integrated circuit (ASIC)) for performing one or more aspects associated with detecting physical link intrusions. For example, IDM 118 may monitor a physical link or a related metric (e.g., a link delay signature) and may determine whether a change in the link or metric meets or exceeds a threshold value (e.g., exceeds one standard deviation from a baseline value). If so, in this example, IDM 118 may determine that a physical link intrusion has occurred and may notify an operator, a network node, or another entity.

IDM 118 may store data associated with detecting physical link intrusions in IDM storage 120. IDM storage 120 may represent any suitable entity (e.g., one or more storage devices, memory, or computer readable media) for storing various link related characteristics, statistics, link delay signatures, link delay data, transit times, historical information, and/or other information usable for detecting physical link intrusions.

In some embodiments, IDM 118 may monitor physical link 116 by analyzing link delay data (e.g., timestamps or transit times of packets traversing physical link 116) or other link related information. For example, assuming that link delay may be measured with significant precision (e.g., in nanoseconds or tenths of nanoseconds) and with regularity (e.g., every few seconds), IDM 118 may detect physical link intrusions when an observed link delay metric changes (e.g., meets or exceeds one standard deviation from a baseline link delay) from a baseline value (e.g., a known or expected link delay metric value. In this example, IDM 118 may assume that a physical link intrusion causes an increase in observed link delay measurements relative to a baseline value (e.g., an expected link delay time based on known link properties and/or current conditions). In other words, observed link delay times may increase from a baseline value when a physical link intrusion occurs and observed link delay times may decrease back towards the baseline when the physical link intrusion is over.

In some embodiments, IDM 118 may perform or utilize any suitable data analysis techniques or methods for detecting physical link intrusions from timing data (e.g., transit times or timestamps) associated with packets traversing physical link 116. For example, data analysis techniques or methods may include or involve a Poisson analysis, a Gaussian analysis, a Bayesian analysis, standard deviation, a sample analysis (e.g., finding an average, a median, and/or a mode for a sample or a data set), a time analysis, a phase analysis, a clock quality analysis, and/or a frequency analysis (e.g., an Allan deviation). For example, IDM 118 may use change (e.g., delta) between timestamps to determine an imputed frequency which may be analyzed for its quality using any known method in the art.

In some embodiments, network devices 108 and 110 may obtain multiple link delay measurements that may be usable for detecting physical link intrusions. Network devices 108 and 110 may represent any suitable entities for generating packets (e.g., frames and/or other data units) and/or for time stamping packets. In some embodiments, each of network devices 108 and 110 may be a test platform used to measure timing, synchronization, quality of service, and other performance metrics, such as one-way link delay and/or jitter.

In some embodiments, network devices 108 and 110 may include electrical network interfaces, optical network interfaces, wired network interfaces, or any combination thereof. An example of a network device suitable for use with embodiments of the subject matter described herein is the Ixia 3500 or another test platform available from Ixia. Other suitable network devices that are capable of generating packets (e.g., Ethernet frames) and/or time stamping packets may be used without departing from the scope of the subject matter described herein.

In some embodiments, network devices 108 and 110 may utilize and/or interact with network taps 104 and 106, respectively. Network taps 104 and 106 may be located at different locations along a physical link 116. Network taps 104 and 106 may represent any suitable entities for injecting (e.g., transmitting), intercepting, copying, and/or receiving packets. Network taps 104 and 106 may include electrical network interfaces, optical network interfaces, wired network interfaces, or any combination thereof. An example of a network tap suitable for use with embodiments of the subject matter described herein is any of the Ixia/Net Optics taps available from Ixia. Other suitable taps that are capable of transmitting copies of received packets on multiple ports may be used.

In some embodiments, network taps 104 and 106 may be active and/or invasive taps capable of injecting packets onto physical link 116. For example, after generating a packet with an origin timestamp, network device 108 may trigger network tap 104 to inject the packet onto physical link 116 towards network tap 106. In this example, network tap 106 may intercept and/or receive the packet and may provide the packet to network device 110. Continuing with this example, network device 110 or network tap 106 may generate a receive timestamp associated with the packet and the timestamps and/or other related information may be stored at data storage 114.

In some embodiments, network devices 108 and 110 and/or network taps 104 and 106 may be synchronized to a common time source or to each other. Any suitable time source and synchronization method may be used. For example, each of network devices 108 and 110 may be connected to a global positioning system (GPS) antenna a may receive GPS timing information via a GPS signal. In this example, each of network devices 108 and 110 may include a local rubidium oscillator as backup in case the GPS signal goes down and may use the local rubidium oscillator to maintain synchronized timing until the GPS signal is restored.

In some embodiments, signals received from GPS satellites may include GPS timing information, which is the same throughout the GPS system. For example, each network device 108 and 110 may receive GPS timing information via its respective GPS antenna and synchronize its ingress packet timestamp capability to the time received in the GPS signals. In this example, because network devices 108 and 110 are synchronized to a common time source, they are also synchronized to each other, and timestamps generated by network devices 108 and 110 are consistent with each other.

In some embodiments, network devices 108 and 110 may be able to generate timestamps for incoming and/or outgoing packets. For example, network device 108 may generate an Ethernet frame that includes a high-precision origin timestamp value and, using network tap 104, the Ethernet frame may be transmitted via physical link 116 towards network tap 106 and/or network device 110. In this example, network device 110 may receive the Ethernet frame and generate a high-precision receive timestamp value corresponding to the Ethernet frame. A similar process may be performed for sending Ethernet frames generated by network device 110 to network device 108.

In some other embodiments, network devices 108 and 110 may be able to generate timestamps for incoming (e.g., ingress) packets, but not for outgoing (e.g., egress) packets. In embodiments where network devices 108 and 110 are unable to time stamp outgoing packets but capable of time stamping incoming packets, network taps 104 and 106 may passively intercept and transmit copies of outgoing packets to network devices 108 or 110 so that the ingress packet time stamping capability of network devices 108 and 110 can be used to generate egress or origin timestamps for the packet copies, and network devices 108 and 110 can use the ingress timestamps as egress timestamps for the outgoing packets transmitted to the remote network device. For example, each of network taps 104 and 106 may be capable of receiving a packet and transmitting copies of the received packet on multiple different ports. In this example, network tap 104 may loop a copy of the transmitted packet back into network device 108. Network device 108, using its ingress time stamping capability, may time stamp the received copy of the packet and the receive timestamp may be used as an origin timestamp for the packet in calculating link delay from network device 108 to network device 110. A similar process may be performed for sending Ethernet frames generated by network device 110 to network device 108.

Additional information regarding measuring link delay is discussed in U.S. patent application Ser. No. 14/685,552 entitled "METHODS, SYSTEMS, AND COMPUTER READABLE MEDIA FOR ONE-WAY LINK DELAY MEASUREMENT", filed Apr. 13, 2015; the disclosure of which is incorporated herein by reference in its entirety.

Network devices 108 and 110 may respectively store data associated with physical link intrusion in data storage 112 and 114. Each of data storages 112 and 114 may represent any suitable entity (e.g., one or more storage devices, memory, or computer readable media) for storing various link related characteristics, statistics, link delay signatures, link delay data, transit times (e.g., for a packet to travel from one location to another location along physical link 116), historical information, and/or other information usable for detecting physical link intrusions. For example, data storage 112 may include transit times for packets traversing physical link 116 sent by network device 110 (via network tap 106) to network device 108 (via network tap 104) and data storage 114 may include transit times for packets traversing physical link 116 sent by network device 108 (via network tap 104) to network device 110 (via network tap 106).

In some embodiments, data obtained by network devices 108 and 110 may be copied, moved, and/or transferred to IDM 118 or IDM storage 120. For example, any suitable mechanisms, methods, and/or communications protocols may be used in obtaining data from data storages 112 and 114. One potential mechanism may involve using an out-of-band delivery system (e.g., such as a separate network, carrier, or link) to obtain data. Another potential mechanism may involve secured network communications, encryption, and/or tunneling protocols. Another potential mechanism may involve a human or carrier service manually retrieving or copying the data from data storages 112 and 114 and downloading it to analytics platform 102 or IDM storage 120. It will also be appreciated that the above described modules, entities, and nodes are for illustrative purposes and that features or portions of features described herein may be performed by different and/or additional modules, entities, or nodes. It will also be appreciated that some modules, entities, and/or nodes may be omitted, combined, and/or integrated. For example, IDM 118 and IDM storage 120 may be implemented using network devices 108 or 110 and analytics platform 102 may be omitted.

Figure 2:
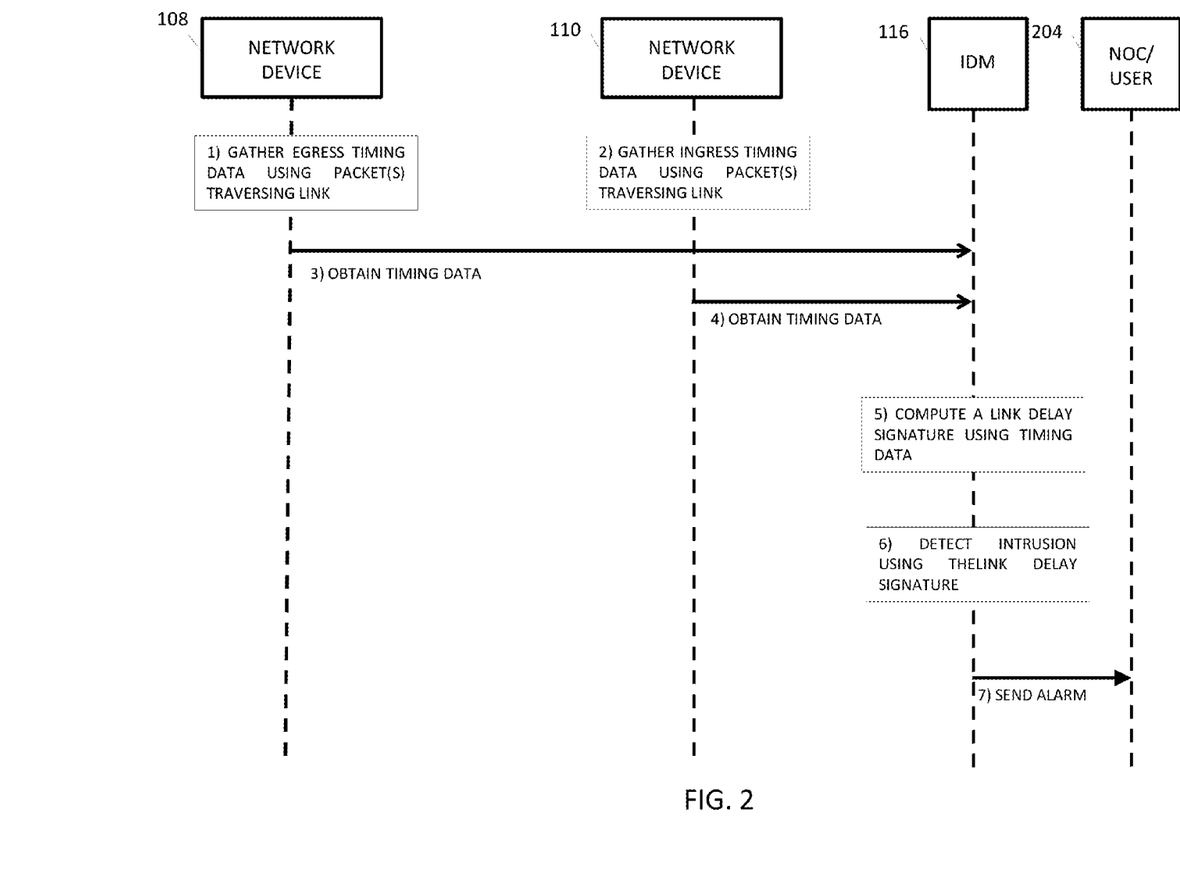
FIG. 2 is a message flow diagram illustrating a process for detecting physical link intrusions according to an embodiment of the subject matter described herein.

FIG. 2 is a message flow diagram illustrating a process for detecting physical link intrusions according to an embodiment of the subject matter described herein. In some embodiments, network devices 108 and 110 may perform one-way link delay measurements using network taps 104 and 106.

In such embodiments, timestamps and/or other information associated with packets or Ethernet frames traversing physical link 116 may be stored in data storage, such as in data storages 112 and 114.

In some embodiments, link delay measurements may be performed periodically, aperiodically, or dynamically. For example, network device 108 may perform link delay measurements by sending Ethernet frames or packets towards network device 110 every five seconds. In another example, network device 110 may perform link delay measurements by sending Ethernet frames or packets towards network device 108 at different frequencies depending on various factors, such as, but not limited to, network congestion, time of day, operator preferences, "suspicious" or abnormal metrics, and/or other factors.

Referring to FIG. 2, in step 1, timing data may be gathered by network device 108 using one or more packets traversing physical link 116. For example, timing data may include timing information (e.g., origin and receive timestamps) for various packets received by network device 108 via network tap 104. In this example, the timing data may be useful for determining link related characteristics, such as one-way link delay for packets traversing physical link 116 from network tap 106 to network tap 104.

In step 2, timing data may be gathered by network device 110 using one or more packets traversing physical link 116. For example, timing data may include timing information (e.g., origin and receive timestamps) for various packets received by network device 110 via network tap 106. In this example, the timing data may be useful for determining link related characteristics, such as one-way link delay for packets traversing physical link 116 from network tap 104 to network tap 106.

In step 3, timing data may be obtained from network device 108. For example, timing data may be stored in a secure manner at data storage 112. In this example, the timing data may be moved, copied, or transferred via various methods, such as via encrypted, secure channels in a network and/or by manual delivery via a carrier service.

In step 4, timing data may be obtained from network device 110. For example, timing data may be stored in a secure manner at data storage 114. In this example, the timing data may be moved, copied, or transferred via various secure methods, such as via encrypted, secure channels in a network and/or by manual delivery via a carrier service.

In step 5, a link delay signature may be computed using the obtained timing data. For example, a link delay signature may indicate link delay or other link related characteristics in an ingress direction and/or an egress direction. In this example, IDM 118 may use various data analysis techniques (e.g., time and/or frequency analyses) and/or other methods for computing a link delay signature.

Some potential analysis techniques or methods for computing a link delay signature and/or for detecting physical link intrusions may include or involve a Poisson analysis, a Gaussian analysis, a Bayesian analysis, a time analysis, and/or a frequency analysis. For example, IDM 118 may analyze data from numerous link delay measurements or other observed or computed metrics for one or more time periods, e.g., a day, a week, an hour, a few minutes, etc. In this example, IDM 118 may analyze the data for identifying patterns or other known or common events. By identifying patterns or common events, IDM 118 may use this knowledge to identify and/or detect physical link intrusions, while ignoring non-malicious activities, which are known a priori to affect link delay.

In step 6, an intrusion may be detected using the link delay signature. For example, IDM 118 may determine a baseline timing distribution (e.g., distribution of observed link delay or transit times for the last hour) associated with physical link 116 using timing data for a relevant time period. In this example, if a subsequently measured timing distribution (e.g., distribution of observed link delay or transit times for the past two minutes) or a value therein is observed that exceeds a predefined threshold value (e.g., exceeds one standard deviation), IDM 118 may determine that a potential network intrusion event has occurred.

In step 7, an alarm may be generated and sent to a network operator center or a user. For example, if a physical link intrusion is detected based a computed link delay signature, IDM 118 may generate an alarm and/or notify a network operator of a potential network intrusion event.

It will be appreciated that the steps depicted in FIG. 2 are for illustrative purposes and that different and/or additional steps may occur. It will also be appreciated that various steps described herein may occur in a different order or sequence. For example, step 1 may occur concurrently with step 2 or after step 2 In another example, step 3 may occur concurrently with step 4 or after step 4.

Figure 3:
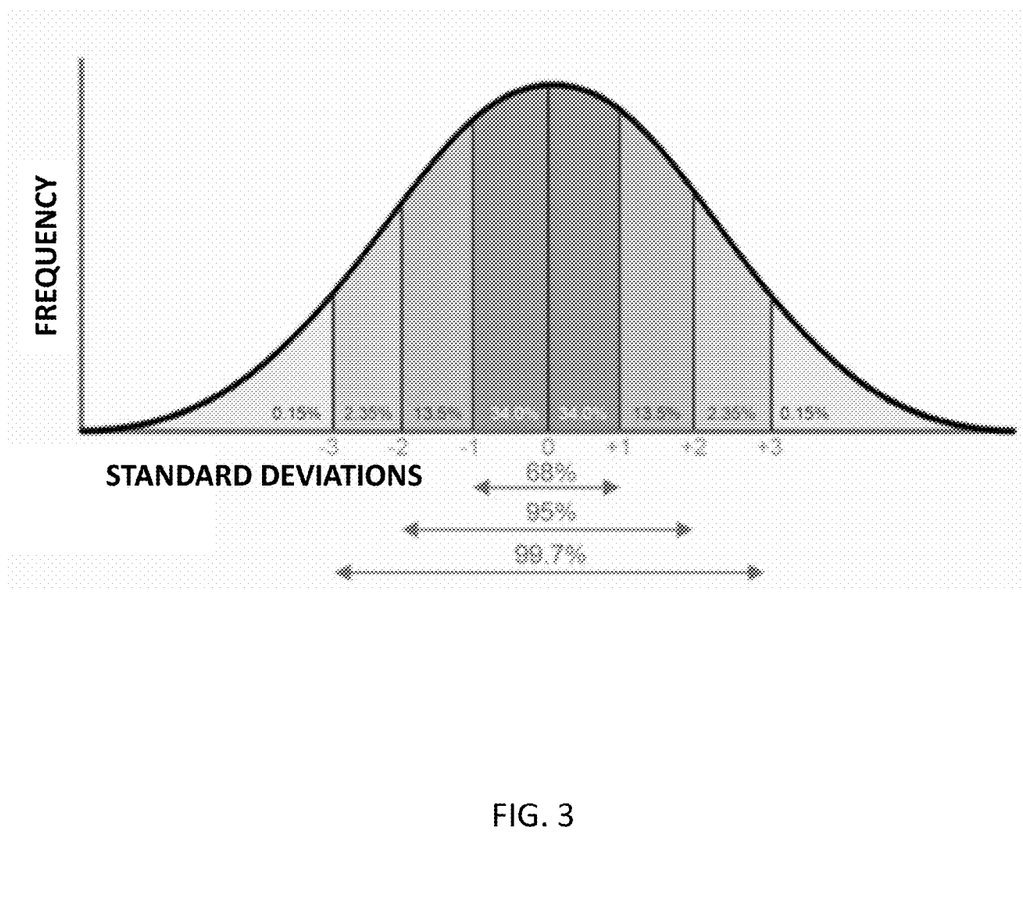
FIG. 3 is a diagram illustrating a normal distribution of transit times for a physical link.

FIG. 3 is a diagram illustrating a normal distribution of transit times for packets traversing physical link 116. In some embodiments, IDM 118 may use timing data (e.g., egress and ingress timestamps) associated with various packets that traverse physical link 116 in a given time period to identify and/or plot a distribution of transit times. In this example, by using a distribution of transit times, IDM 118 may identify natural or non-intrusion related patterns associated with length delay, while also identifying events or occurrences that are not normal and/or are potential intrusion related events.

As depicted in FIG. 3, observed transit times for a particular time period may indicate a normal distribution. The depicted normal distribution may indicate that about 68% of all observed transit times are within one standard deviation (e.g., one standard deviation on either side of the mean represented by a '0'). The depicted normal distribution may also indicate about 95% of all observed transit times are within two standard deviations (e.g., two standard deviations on either side of the mean). The depicted standard deviation may also depict about 97% of all observed transit times are within three standard deviations (e.g., three standard deviations on either side of the mean).

In some embodiments, standard deviation may be useful in determining threshold values for indicating when a physical link intrusion has occurred. For example, IDM 118 may use a threshold value of one standard deviation, whereby if a monitored metric (e.g., a bi-directional or uni-directional link delay signature) exceeds a baseline value by one or more standard deviations, then IDM 118 may determine that a physical link intrusion has occurred and an alarm may be generated to notify one or more relevant entities. However, continuing with this example, if the monitored metric does not exceed a baseline value by one or more standard deviations, then IDM 118 may determine that a physical link intrusion has not occurred.

In some embodiments, multiple threshold values and/or multiple metrics associated with physical link 116 may be used when detecting physical link intrusions. For example, in an asymmetrical network where an ingress direction between network taps 104 and 106 is not the same length or speed as an egress direction between network taps 104 and 106, IDM 118 may monitor link delay in each direction and may use the same threshold values or different threshold values for the directions when determining whether a physical link intrusion has occurred.

It will be appreciated that the normal distribution depicted in FIG. 3 is for illustrative purposes and that different distributions of transit times may occur along physical link 116 or other monitored links. Further, while sample standard deviation may be useful for setting threshold values for various distribution models, other statistics analysis techniques and/or approaches may be useful in detecting physical link intrusions and/or setting threshold values for indicating when a physical link intrusion has occurred.

Figure 4:
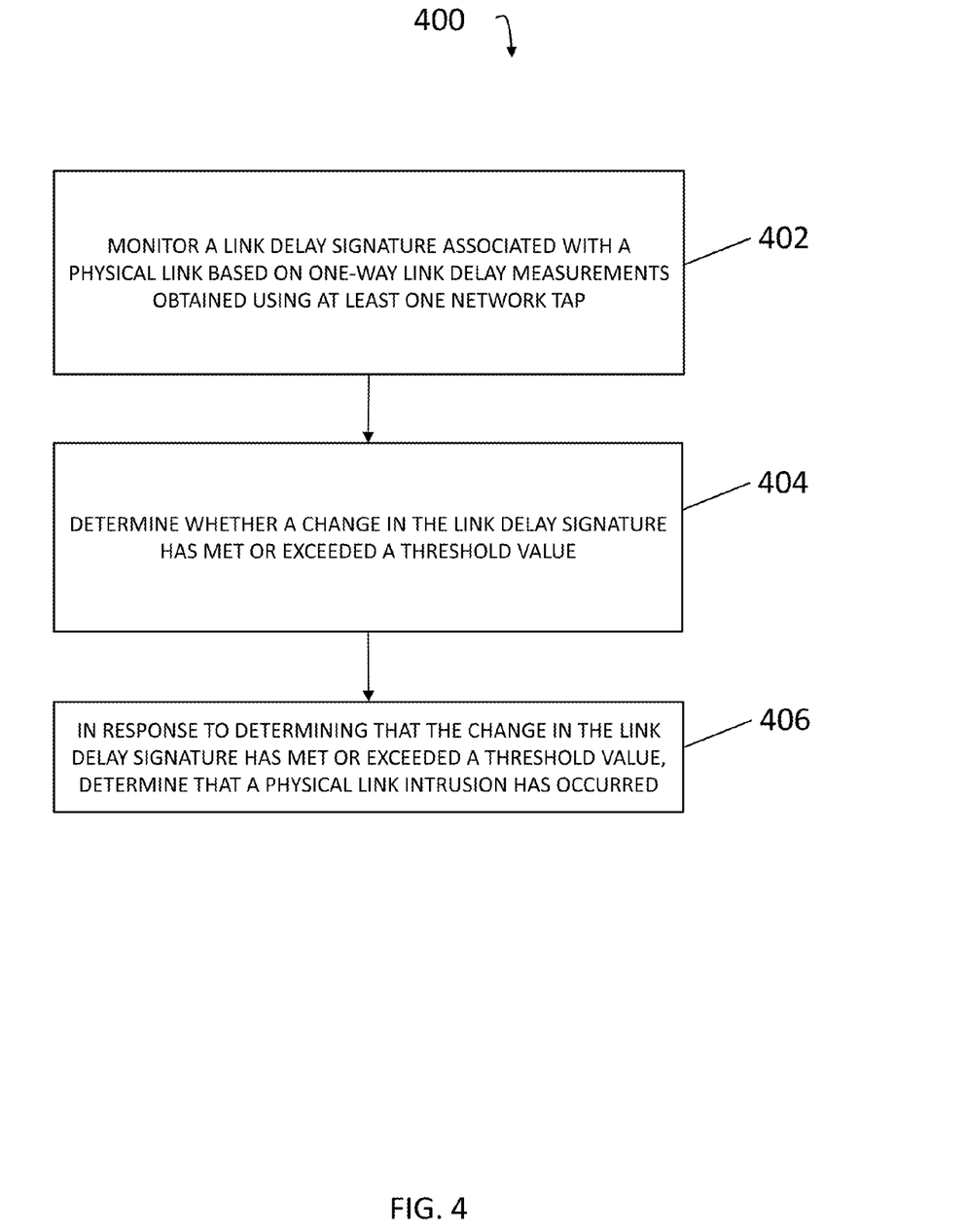
FIG. 4 is a flow chart of a process for detecting physical link intrusions according to an embodiment of the subject matter described herein.

FIG. 4 is a flow chart of a process 400 for detecting physical link intrusions according to an embodiment of the subject matter described herein. In some embodiments, process 400, or portions thereof (e.g., steps 402, 404 and/or 406), may be performed by or at analytics platform 102, IDM 118, and/or another node or module.

Referring to process 400, in step 402, a link delay signature associated with physical link 116 may be monitored. The link delay signature may represent one or more metrics for indicating link delay or other link related characteristics associated with physical link 116. In some embodiments, the link delay signature may be based on one-way link delay measurements obtained using at least one network tap. In some embodiments, the link delay signature may represent link delay in one direction (e.g., a one-way link delay signature) or in two directions (e.g., a bi-directional link delay signature). In step 404, it may be determined whether a change in the link delay signature has met or exceeded a threshold value. For example, assuming that a baseline value is 4 nanoseconds, that a threshold value is one standard deviation, and that the one standard deviation represents plus or minus 2 nanoseconds, IDM 118 may determine that a link delay signature indicating a transit time for a packet traversing physical link 116 of 6 nanoseconds or greater (or two nanoseconds or less) meets or exceeds the threshold value.

In step 406, in response to determining that the change in the link delay signature has met or exceeded a threshold value, it may be determined that a physical link intrusion has occurred. Using the above example, after observing a link delay signature indicating a transit time for a packet traversing physical link 116 of 6 nanoseconds, IDM 118 may determine that a physical link intrusion has occurred and may notify a network operator and/or may initiate other security related actions. In some embodiments, a one-way link delay measurement may be obtained by transmitting a first packet from a first network device (e.g., network device 108), at a network tap (e.g., network tap 104), passively intercepting the first packet, transmitting a first copy of the first packet to the first network device, and transmitting a second copy of the first packet to a second network device (e.g., network device 110), at the first network device, recording a time of receipt of the first copy of the first packet as an origin timestamp, at the second network device, recording a time of receipt of the second copy of the first packet as a receive timestamp, transmitting a second packet from the first network device, the second packet including the origin timestamp, at the network tap, passively intercepting the second packet and transmitting a first copy of the second packet to the second network device, at the second network device, receiving the first copy of the second packet and extracting the origin timestamp from the first copy of the second packet, and calculating link delay from the first network device to the second network device using the origin timestamp and the receive timestamp.

In some embodiments, a physical link is a wired link, an electrical link, an optical link, a fiber link, or a fiber-optic link.

In some embodiments, determining whether a change in a link delay signature has met or exceeded a threshold value includes performing data analysis using one-way link delay measurements or other data. For example, data analysis may include time analysis (e.g., focusing on packet timestamps) and/or frequency analysis (e.g., focusing on when or how often packets are sent or received).

In some embodiments, a threshold value for indicating that a physical link intrusion has occurred may meet or exceed a baseline value. For example, assuming that a baseline value is an expected link delay for physical link 116 based on historical information, link properties, and/or other information, IDM 118 may use a threshold value of one standard deviation. In this example, if an observed link delay value exceeds the baseline value by one standard deviation or more, IDM 118 may determine that a physical link intrusion occurred and may generate an alarm.

In some embodiments, one-way link delay measurements are obtained periodically, aperiodically, or dynamically. For example, each of network devices 108 and 110 may initiate link delay measurements by generating and sending packets traversing physical link 116 every three seconds, every minute, randomly throughout the day, or based on network conditions.

It will be appreciated that process 400 is for illustrative purposes and that different and/or additional actions may be used. It will also be appreciated that various actions described herein may occur in a different order or sequence.

It should be noted that analytics platform 102, IDM 118, and/or functionality described herein may constitute a special purpose computing device, such as the Ixia 3500 or another test platform. Further, analytics platform 102, IDM 118, and/or functionality described herein can improve the technological field of network security by providing a tenable solution for detecting physical link intrusion via high-precision link delay measurements. Further, analytics platform 102, IDM 118, and/or functionality described herein can improve the technological field of network security by analyzing one-way link delay characteristics independently, thereby improving efficacy in asymmetrical networks.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for detecting physical link intrusions in a network, the method comprising:

monitoring a link delay signature associated with a physical link based on one-way link delay measurements obtained using at least one network tap;

determining whether a change in the link delay signature has met or exceeded a threshold value; and in response to determining that the change in the link delay signature has met or exceeded a threshold value, determining that a physical link intrusion has occurred, wherein one of the one-way link delay measurements for determining the change in the link delay signature is obtained by:

transmitting a first packet from a first network device;

passively intercepting the first packet, transmitting a first copy of the first packet to the first network device, and transmitting a second copy of the first packet to a second network device;

at the first network device, recording a time of receipt of the first copy of the first packet as an origin timestamp;

at the second network device, recording a time of receipt of the second copy of the first packet as a receive timestamp;

transmitting a second packet from the first network device, the second packet including the origin timestamp;

passively intercepting the second packet and transmitting a first copy of the second packet to the second network device;

at the second network device, receiving the first copy of the second packet and extracting the origin timestamp from the first copy of the second packet; and calculating link delay from the first network device to the second network device using the origin timestamp and the receive timestamp.

2. The method of claim 1 wherein each of the first network device and the second network device comprises a network equipment test device.

3. The method of claim 1 wherein the first network device and the second network device are synchronized to a common clock source.

4. The method of claim 1 wherein the physical link is a wired link, an electrical link, an optical link, a fiber link, or a fiber-optic link.

5. The method of claim 1 wherein determining whether the change in the link delay signature has met or exceeded the threshold value includes performing data analysis using the one-way link delay measurements.

6. The method of claim 5 wherein the data analysis includes time analysis and/or frequency analysis.

7. The method of claim 1 wherein the threshold value meets or exceeds a baseline value.

8. The method of claim 1 wherein the one-way link delay measurements are obtained periodically, aperiodically, or dynamically.

9. A system for detecting physical link intrusions in a network, the system comprising:

a processor;

a memory; and an intrusion detection module (IDM) implemented using the processor and the memory, wherein the IDM is configured to monitor a link delay signature associated with a physical link based on one-way link delay measurements obtained using at least one network tap, to determine whether a change in the link delay signature has met or exceeded a threshold value, and to, in response to determining that the change in the link delay signature has met or exceeded a threshold value, determine that the physical link has been compromised, wherein one of the one-way link delay measurements for determining the change in the link delay signature is obtained by:

transmitting a first packet from a first network device;

passively intercepting the first packet, transmitting a first copy of the first packet to the first network device, and transmitting a second copy of the first packet to a second network device;

at the first network device, recording a time of receipt of the first copy of the first packet as an origin timestamp;

at the second network device, recording a time of receipt of the second copy of the first packet as a receive timestamp;

transmitting a second packet from the first network device, the second packet including the origin timestamp;

passively intercepting the second packet and transmitting a first copy of the second packet to the second network device;

at the second network device, receiving the first copy of the second packet and extracting the origin timestamp from the first copy of the second packet; and calculating link delay from the first network device to the second network device using the origin timestamp and the receive timestamp.

10. The system of claim 9 wherein each of the first network device and the second network device comprises a network equipment test device.

11. The system of claim 9 wherein the first network device and the second network device are synchronized to a common clock source.

12. The system of claim 9 wherein the physical link is a wired link, an electrical link, an optical link, a fiber link, or a fiber-optic link.

13. The system of claim 9 wherein the IDM is configured to perform data analysis using the one-way link delay measurements.

14. The system of claim 13 wherein the data analysis includes time analysis and/or frequency analysis.

15. The system of claim 9 wherein the threshold value meets or exceeds a baseline value.

16. The system of claim 9 wherein the one-way link delay measurements are obtained periodically, aperiodically, or dynamically.

17. A non-transitory computer readable medium having stored thereon executable instructions embodied in the computer readable medium that when executed by a processor of a computer cause the computer to perform steps comprising:

monitoring a link delay signature associated with a physical link based on one-way link delay measurements obtained using at least one network tap;

determining whether a change in the link delay signature has met or exceeded a threshold value; and in response to determining that the change in the link delay signature has met or exceeded a threshold value, determining that a physical link intrusion has occurred, wherein one of the one-way link delay measurements for determining the change in the link delay signature is obtained by:

transmitting a first packet from a first network device;

passively intercepting the first packet, transmitting a first copy of the first packet to the first network device, and transmitting a second copy of the first packet to a second network device;

at the first network device, recording a time of receipt of the first copy of the first packet as an origin timestamp;

at the second network device, recording a time of receipt of the second copy of the first packet as a receive timestamp;

transmitting a second packet from the first network device, the second packet including the origin timestamp;

passively intercepting the second packet and transmitting a first copy of the second packet to the second network device;

at the second network device, receiving the first copy of the second packet and extracting the origin timestamp from the first copy of the second packet; and calculating link delay from the first network device to the second network device using the origin timestamp and the receive timestamp.

\* \* \* \* \*